(12) United States Patent
Leck et al.

(10) Patent No.: US 7,157,020 B2
(45) Date of Patent: Jan. 2, 2007

(54) REFRIGERANT COMPOSITIONS COMPRISING PERFORMANCE ENHANCING ADDITIVES

(75) Inventors: Thomas J. Leck, Hockessin, DE (US); Paul Joseph Fagan, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/980,694

(22) Filed: Nov. 3, 2004

(65) Prior Publication Data
US 2005/0109978 A1 May 26, 2005

Related U.S. Application Data

(62) Division of application No. 10/638,230, filed on Aug. 7, 2003, now abandoned.

(60) Provisional application No. 60/402,364, filed on Aug. 8, 2002.

(51) Int. Cl.
C09K 5/04 (2006.01)
C10L 1/224 (2006.01)
(52) U.S. Cl. .................. 252/68; 508/243
(58) Field of Classification Search .............. 252/68
See application file for complete search history.

(56) References Cited

U.S. PATENT DOCUMENTS

| | | | |
|---|---|---|---|
| 4,428,554 A | 1/1984 | Hartman | |
| 4,755,316 A | 7/1988 | Magid et al. | |
| 4,963,280 A | 10/1990 | Wilkins | |
| 5,194,171 A | 3/1993 | Jolley | |
| 5,547,593 A * | 8/1996 | Sanechika et al. | .......... 508/207 |
| 5,826,436 A | 10/1998 | Scaringe et al. | |
| 5,858,266 A | 1/1999 | Kaneko | |
| 5,866,030 A | 2/1999 | Reyes-Gavilan et al. | |
| 5,987,902 A | 11/1999 | Scaringe et al. | |
| 6,306,803 B1 | 10/2001 | Tazaki | |
| 6,362,139 B1 | 3/2002 | Sgarbi et al. | |
| 2001/0019120 A1 | 9/2001 | Schnur et al. | |
| 2002/0013233 A1 | 1/2002 | Corr et al. | |

FOREIGN PATENT DOCUMENTS

| | | |
|---|---|---|
| EP | 612835 B1 | 8/1994 |
| EP | 612839 A1 | 8/1994 |
| EP | 881278 A1 | 2/1998 |

OTHER PUBLICATIONS

Lawrence R. Grzyll et al., "A Performance-Enhancing Additive for Vapor-Compression Heat Pumps: Additional Test Results", Proc. Int'l Conference on Refining @ Purdue, pp. 547-553, 2000.
Hsinheng Li et al., "Development of a POE Lubricant for Rotary Compressors Using HFC Refrigerants", Proc. of the Int'l Refrig. Conf. @ Purdue, $7^{th}$, pp. 373-378, 1998.
Lawrence R. Grzyll et al., "The Development of a Performance-Enhancing Additive for Vapor-Compression Heat Pumps", Proc. $32^{nd}$ IECEC, vol. 2, pp. 1252-1257, 1997.
Spyros I. Tseregounls et al., "Solubility of HFC-134a Refrigerant in Glycol-Type Compounds: Effects of Glycol Structure", AICHE Journal, Apr. 1994, vol. 40, No. 4, pp. 726-737.
Thomas E. Rajewski et al., "Lubricants for Environmentally Friendly Refrigeration Applications", Int'l Symp. on Fuels & Lubricants, Symp. Papers, $2^{nd}$, vol. 2, pp. 767-774, 2000.
International Search Report, date mailed Sep. 7, 2004.

* cited by examiner

Primary Examiner—John R. Hardee
(74) Attorney, Agent, or Firm—Chyrrea J. Sebree; Jane O. Hamby (57) ABSTRACT

The present invention is related to refrigerant and lubricant compositions containing performance-enhancing additives. The performance enhancing additives are found to improve the energy efficiency and capacity of vapor compression refrigeration and air conditioning systems, which utilize hydrofluorocarbon refrigerants (e.g. HFC-134a ) and oxygenated refrigeration lubricants (e.g. POEs, PAGs and PVEs).

32 Claims, 1 Drawing Sheet

REFRIGERANT COMPOSITIONS COMPRISING PERFORMANCE ENHANCING ADDITIVES

CROSS REFERENCE TO RELATED APPLICATION

This application is a divisional of U.S. patent application Ser. No. 10/638,230, filed Aug. 7, 2003, now abandoned that claims the priority benefit of U.S. Provisional Application No. 60/402,364, filed Aug. 8, 2002.

FIELD OF THE INVENTION

The present invention is related to refrigerant and lubricant compositions containing performance-enhancing additives. The performance enhancing additives are found to improve the energy efficiency and/or the capacity of vapor compression refrigeration and air conditioning systems, which utilize hydrofluorocarbon refrigerants and oxygenated refrigeration lubricants.

BACKGROUND

Environmental concerns regarding excessive energy consumption has prompted many industries to modify their commercial products and/or equipment designs to conserve more energy. Consistent with this objective of energy conservation, the refrigeration and air-conditioning industries are constantly seeking to improve energy efficiency of vapor compression refrigeration and air-conditioning systems. For example, additives have been added to the refrigerant/lubricant mixture in order to increase the efficiency of vapor compression refrigeration and air-conditioning systems. The additive primarily suggested was tetraethylene glycol dimethyl ether or tetraglyme. However, tetraglyme, and similar glycol ethers with ethylene repeat units have been known to exhibit negative reproductive health effects, which clearly makes them undesirable for use in this application.

Other suggestions have been proposed to address this problem including changes in the design of refrigeration and air-conditioning systems. Unfortunately, many of these suggestions introduce additional complications or disadvantages into the refrigeration and air-conditioning systems.

Accordingly, there is a need for non-toxic, performance-enhancing additives that will improve the energy efficiency and the capacity of vapor-compression refrigeration and air-conditioning systems.

SUMMARY

The present invention is directed to compositions containing commercially acceptable performance enhancing additives selected from the group consisting of polyoxyalkylene glycol ethers, amides, nitriles, chlorocarbons, aryl ethers 1,1,1-trifluoroalkanes, fluoroethers, lactones, esters, crown compounds, cyclodextrins, and calixarenes. The aforementioned compositions also contain at least one hydrofluorocarbon (HFC), perfluorocarbon (PFC), hydrofluoroether (HFE), ammonia and/or carbon dioxide refrigerant and at least one polyol ester (POE), polyalkylene glycol (PAG), or polyvinyl ether (PVE) lubricants.

It has been discovered that the use of said additives improves the energy efficiency and/or the capacity of vapor-compression refrigeration and air-conditioning systems. The additives increase the solubility of refrigerants, such as hydrofluorocarbons (HFCs), perfluorocarbons (PFCs), hydrofluoroether (HFE), ammonia and carbon dioxide, in refrigeration lubricants such as polyol esters (POEs), polyalkylene glycols (PAGs), or polyvinyl ethers (PVEs). This increased solubility results in an increase in the heat of vaporization or latent heat. Increased heat of vaporization improves energy efficiency, as well as cooling and heating capacity of vapor compression refrigeration and air-conditioning systems. Additionally, the present additives solubilize marginally soluble fractions, such as low molecular weight oligomers and plasticizers that are typically present and problematic in vapor compression refrigeration systems.

BRIEF DESCRIPTION OF THE FIGURE

These and other features, aspects, and advantages of the present invention will become better understood with regard to the following description, appended claims, and accompanying figure where:

DETAILED DESCRIPTION

The present inventors discovered that using an effective amount of the present additives in vapor-compression refrigeration and air-conditioning equipment improves performance of these systems. When the additive is combined with POE, PAG or PVE lubricants and refrigerants selected from the group consisting of hydrofluorocarbons (HFCs), perfluorocarbons (PFCs), hydrofluoroethers (HFEs), ammonia and carbon dioxide in a refrigeration system, an improvement in energy efficiency and/or capacity occurs. The present additives improve the energy efficiency and cooling capacity of a vapor-compression refrigeration system by increasing the heat of vaporization upon desorption of the refrigerant from the lubricant and additive composition in the evaporator. Without wishing to be bound by theory, it is believed that breaking the attractions between the refrigerant and the polar, functional group-containing additive results in the increase in heat of vaporization. Likewise, the additives improve the heating capacity of such a system by increasing the heat of solution upon absorption of the refrigerant into the lubricant and additive composition in the condenser.

The present additives also solubilize low molecular weight oligomers, contained in polymers such as Mylar® and other polyesters. The additives also solubilize plasticizers, such as phthalate esters, stearates and other marginally soluble fractions, which can be extracted from elastomers or polymers by the HFC, PFC or HFE refrigerants, ammonia or carbon dioxide refrigerants or by POE, PAG or PVE lubricants. These extracted fractions can be redeposited in heat exchangers and expansion devices and cause loss of heat transfer and pluggage of tubes and control devices. By keeping these oligomers and plasticizers in solution, they do not form harmful deposits, thus increasing reliability, energy efficiency and overall performance of compression refrigeration equipment.

In the present compositions comprising lubricant and additive, from about 1 to about 99 weight percent, preferably from about 1 to about 60 weight percent, most preferably about 1 to about 20 weight percent of the combined lubricant and additive composition is additive. In terms of weight ratios, in the present compositions comprising lubricant and additive, the weight ratio of lubricant to additive is from about 99:1 to about 1:99, preferably from about 99:1 to about 40:60, most preferably about 99:1 to about 80:20. Additive may be charged to vapor-compression, refrigeration and air-conditioning systems as a composition of additive, HFCs, PFCs, HFEs, ammonia and/or carbon dioxide refrigerant. When charging compression refrigeration and air-conditioning systems, the additive and refrigerant composition will typically contain from about 0.1 to about 20 weight percent, preferably from about 0.1 to about 10 weight percent additive in the combined additive and refrigerant composition. In vapor-compression refrigeration and air-conditioning systems containing the present compositions comprising HFCs, PFCs, HFEs, ammonia and/or carbon dioxide, lubricant and additive, from about 1 to about 70 weight percent, preferably from about 1 to about 60 weight percent of the refrigerant, lubricant and additive composition is lubricant and additive.

Fluorocarbon refrigerants of the present invention contain at least one carbon atom and one fluorine atom. Of particular utility are fluorocarbons having 1–6 carbon atoms containing at least one fluorine atom, optionally containing oxygen atoms, and having a normal boiling point of from −90° C. to 80° C. These fluorocarbons may be represented by the general formula $C_xF_{2x+2-y}H_yO_z$, wherein x is 1–6, y is 0–9, and z is 0–2 Fluorocarbon refrigerants thus include hydrofluorocarbons (HFCs), and perfluorocarbons (PFCs), and hydrofluoroethers (HFEs). Preferred of the fluorocarbons are those in which x is 1–6, y is 1–5 and z is 0–1. Fluorocarbons are commercial products available from a number of sources such as E. I. du Pont de Nemours & Co., Fluoroproducts, Wilmington, Del., 19898, USA, and additionally by synthetic processes disclosed in art such as Chemistry of Organic Fluorine Compounds, edited by Milos Hudlicky, published by The MacMillan Company, New York, N.Y., 1962. Representative fluorocarbons include: $CHF_3$ (HFC-23), $CH_2F_2$ (HFC-32), $CH3F$ (HFC-41), $CF3CF3$ (PFC-116), $CHF_2CF_3$ (HFC-125), $CHF_2CHF_2$ (HFC-134), $CH_2FCF_3$ (HFC-134a), $CHF_2CH_2F$ (HFC143), $CF_3CH_3$ (HFC-143a), $CHF_2CH_3$ (HFC-152a), $CH_2FCH_3$ (HFC-161), $CF_3CF_2CF_3$ (PFC-218), $CHF_2CF_2CF_3$ (HFC-227ca, $CF_3CFHCF_3$ (HFC-227ea), $CHF_2CF_2CHF_2$ (HFC-236ca), $CH_2FCF_2CF_3$ (HFC-236cb), $CHF_2CHFCF_3$ (HFC-236ea), $CF_3CH_2CF_3$ (HFC-236fa), $CH_2FCF_2CHF_2$ (HFC-245ca), $CH_3CF_2CF_3$ (HFC-245cb), $CHF_2CHFCHF_2$ (HFC-245ea), $CH_2FCHFCF_3$ (HFC-245eb), $CHF_2CH_2CF_3$ (HFC-245fa), $CH_2FCF_2CH_2F$ (HFC-254ca), $CH_2CF_2CHF_2$ (HFC-254cb), $CH_2FCHFCHF_2$ (HFC-254ea), $CH_3CHFCF_3$ (HFC-254eb), $CHF_2CH_2CHF_2$ (HFC-254fa), $CH_2FCH_2CF_3$ (HFC-254fb), $CH_3CF_2CH_3$ (HFC-272ca), $CH_3CHFCH_2F$ (HFC-272ea), $CH_2FCH_2CH_2F$ (HFC-272fa), $CH_3CH_2CF_2H$ (HFC-272fb), $CH_3CHFCH_3$ (HFC-281ea), $CH_3CH_2CH_2F$ (HFC-281fa), cyclo-C4F8 (PFC—C318), $CHF_2CF_2CF_2CF_2H$ (HFC-338 pcc), $CF_3CHFCHFCF_2CF_3$ (HFC-43-10mee), $C_4F_9OCH_3$, and $C_4F_9OC_2H_5$.

The fluorocarbon refrigerants of the present invention may optionally further comprise azeotropic and azeotrope-like fluorocarbon refrigerant compositions, such as, HFC-125/HFC-143a/HFC-134a (known by the ASHRAE designation, R-404A), HFC-32/HFC-125/HFC-134a (known by ASHRAE designations, R-407A, R-407B, and R-407C), HFC-32/HFC-125 (R-410A), and HFC-125/HFC-143a (known by the ASHRAE designation: R-507).

Refrigerants of the present invention further comprise ammonia and/or carbon dioxide. Additionally, refrigerants may comprise mixtures of fluorocarbon refrigerants and ammonia and/or carbon dioxide.

Refrigerants of the present invention may optionally further comprise up to 10 weight percent of dimethyl ether or at least one $C_3$ to $C_5$ hydrocarbon, e.g., propane, propylene, cyclopropane, n-butane, i-butane, and n-pentane. Examples of fluorocarbons containing such $C_3$ to $C_5$ hydrocarbons are azeotrope-like compositions of HFC-125/HFC-134a/n-butane (known by the ASHRAE designation R-417A).

Refrigeration lubricants of the present invention are those which have been designed for use with hydrofluorocarbon refrigerants and are miscible with fluorocarbons of the present invention under compression refrigeration and air-conditioning systems' operating conditions. Such lubricants and their properties are discussed in "Synthetic Lubricants and High-Performance Fluids", R. L. Shubkin, editor, Marcel Dekker, 1993. Typical refrigeration lubricants have viscosity of at least 9 centistokes at 40 degrees Celsius. Refrigeration lubricants include, but are not limited to, polyol esters (POEs), polyalkylene glycols (PAGs), and polyvinyl ethers (PVEs).

Additives of the present invention comprise polyoxyalkylene glycol ethers represented by the formula $R^1[(OR^2)_xOR^3]_y$, wherein: x is selected from integers from 1–3; y is selected from integers from 1–4; $R^1$ is selected from hydrogen and aliphatic hydrocarbon radicals having 1 to 6 carbon atoms and y bonding sites; $R^2$ is selected from aliphatic hydrocarbylene radicals having from 3 to 4 carbon atoms; $R^3$ is selected from hydrogen and aliphatic and alicyclic hydrocarbon radicals having from 1 to 6 carbon atoms; at least one of $R^1$ and $R^3$ is said hydrocarbon radical; and wherein said polyoxyalkylene glycol ethers have a molecular weight of from about 100 to about 300 atomic mass units and a carbon to oxygen ratio of from about 2.3 to about 5.0. In the present invention, polyoxyalkylene glycol ether additives represented by $R^1[(OR^2)_xOR^3]_y$: x is preferably 1–2; y is preferably 1; $R^1$ and $R^3$ are preferably independently selected from hydrogen and aliphatic hydrocarbon radicals having 1 to 4 carbon atoms; $R^2$ is preferably selected from aliphatic hydrocarbylene radicals having from 3 or 4 carbon atoms, most preferably 3 carbon atoms; the polyoxyalkylene glycol ether molecular weight is preferably from about 100 to about 250 atomic mass units, most preferably from about 125 to about 250 atomic mass units; and the polyoxyalkylene glycol ether carbon to oxygen ratio is preferably from about 2.5 to 4.0, most preferably from about 2.7 to about 3.5. The $R^1$ and $R^3$ hydrocarbon radicals having 1 to 6 carbon atoms may be linear, branched or cyclic. Representative $R^1$ and $R^3$ hydrocarbon radicals include methyl, ethyl, propyl, isopropyl, butyl, isobutyl, sec-butyl, tert-butyl, pentyl, isopentyl, neopentyl, tert-pentyl, cyclopentyl, and cyclohexyl. Where free hydroxyl radicals on the present polyoxyalkylene glycol ether additives may be incompatible with certain compression refrigeration apparatus materials of construction (e.g. Mylar®), $R^1$ and $R^3$ are preferably aliphatic hydrocarbon radicals having 1 to 4 carbon atoms, most preferably 1 carbon atom. The $R^2$ aliphatic hydrocarbylene radicals having from 3 to 4 carbon atoms form repeating oxyalkylene radicals—$(OR^2)_x$— that include oxypropylene radicals and oxybutylene radicals. The oxyalkylene radical comprising $R^2$ in one polyoxyalkylene glycol ether additive molecule may be the same, or one molecule may contain different $R^2$ oxyalkylene groups. The present polyoxyalkylene glycol ether additives preferably comprise at least one oxypropylene radical. Where $R^1$ is an aliphatic or alicyclic hydrocarbon radical having 1 to 6 carbon atoms and y bonding sites, the radical may be linear, branched or cyclic. Representative $R^1$ aliphatic hydrocarbon radicals having two bonding sites include, for example, an ethylene radical, a propylene radical, a butylene radical, a pentylene radical, a hexylene radical, a cyclopentylene radical and a cyclohexylene radical. Representative $R^1$ aliphatic hydrocarbon radicals having three or four bonding sites include residues derived from polyalcohols, such as trimethylolpropane, glycerin, pentaerythritol, 1,2,3-trihydroxycyclohexane and 1,3,5-trihydroxycyclohexane, by removing their hydroxyl radicals.

Representative polyoxyalkylene glycol ether additives include: $CH_3OCH_2CH(CH_3)O(H$ or $CH_3)$ (propylene glycol methyl (or dimethyl) ether), $CH_3O[CH_2CH(CH_3)O]_2(H$ or $CH_3)$ (dipropylene glycol methyl (or dimethyl) ether), $CH_3O[CH_2CH(CH_3)O]_3(H$ or $CH_3)$ (tripropylene glycol methyl (or dimethyl) ether), $C_2H_5OCH_2CH(CH_3)O(H$ or $C_2H_5)$ (propylene glycol ethyl (or diethyl) ether), $C_2H_5O[CH_2CH(CH_3)O]_2(H$ or $C_2H_5)$ (dipropylene glycol ethyl (or diethyl) ether), $C_2H_5O[CH_2CH(CH_3)O]_3(H$ or $C_2H_5)$ (tripropylene glycol ethyl (or diethyl) ether), $C_3H_7OCH_2CH(CH_3)O(H$ or $C_3H_7)$ (propylene glycol n-propyl (or di-n-propyl) ether), $C_3H_7O[CH_2CH(CH_3)O]_2(H$ or $C_3H_7)$ (dipropylene glycol n-propyl (or di-n-propyl) ether), $C_3H_7O[CH_2CH(CH_3)O]_3(H$ or $C_3H_7)$ (tripropylene glycol n-propyl (or di-n-propyl) ether), $C_4H_9OCH_2CH(CH_3)OH$ (propylene glycol n-butyl ether), $C_4H_9O[CH_2CH(CH_3)O]_2(H$ or $C_4H_9)$ (dipropylene glycol n-butyl (or di-n-butyl) ether), $C_4H_9O[CH_2CH(CH_3)O]_3(H$ or $C_4H_9)$ (tripropylene glycol n-butyl (or di-n-butyl) ether), $(CH_3)_3COCH_2CH(CH_3)OH$ (propylene glycol t-butyl ether), $(CH_3)_3CO[CH_2CH(CH_3)O]_2(H$ or $(CH_3)_3)$ (dipropylene glycol t-butyl (or di-t-butyl) ether), $(CH_3)_3CO[CH_2CH(CH_3)O]_3(H$ or $(CH_3)_3)$ (tripropylene glycol t-butyl (or di-t-butyl) ether), $C_5H_{11}OCH_2CH(CH_3)OH$ (propylene glycol n-pentyl ether), $C_4H_9OCH_2CH(C_2H_5)OH$ (butylene glycol n-butyl ether), $C_4H_9O[CH_2CH(C_2H_5)O]_2H$ (dibutylene glycol n-butyl ether), trimethylolpropane tri-n-butyl ether $(C_2H_5C(CH_2O(CH_2)_3CH_3)_3)$ and trimethylolpropane di-n-butyl ether $(C_2H_5C(CH_2OC(CH_2)_3CH_3)_2CH_2OH)$.

The polyoxyalkylene glycol ether additives generally have a kinematic viscosity of less than about 5 centistokes at 40° C. For instance, dipropylene glycol dimethyl ether (DMM) has kinematic viscosity of 0.90 centistokes at 40° C. and dipropylene glycol methyl ether has viscosity of 2.7 centistokes at 40° C.

Additives of the present invention further comprise amides represented by the formulae $R^1CONR^2R^3$ and cyclo-$[R^4CON(R^5)-]$, wherein $R^1$, $R^2$, $R^3$ and $R^5$ are independently selected from aliphatic and alicyclic hydrocarbon radicals having from 1 to 12 carbon atoms, and at most one aromatic radical having from 6 to 12 carbon atoms; $R^4$ is selected from aliphatic hydrocarbylene radicals having from 3 to 12 carbon atoms; and wherein said amides have a molecular weight of from about 120 to about 300 atomic mass units and a carbon to oxygen ratio of from about 7 to about 20. The molecular weight of said amides is preferably from about 120 to about 250 atomic mass units. The carbon to oxygen ratio in said amides is preferably from about 7 to about 16, and most preferably from about 10 to about 14. $R^1$, $R^2$, $R^3$ and $R^5$ may optionally include substituted radicals, that is, radicals containing non-hydrocarbon substituents selected from halogens (e.g., fluorine, chlorine) and alkoxides (e.g. methoxy). $R^1$, $R^2$, $R^3$ and $R^5$ may optionally include heteroatom-substituted radicals, that is, radicals which contain the atoms nitrogen (aza-), oxygen (oxa-) or sulfur (thia-) in a radical chain otherwise composed of carbon atoms. In general, no more than three non-hydrocarbon substituents and heteroatoms, and preferably no more than one, will be present for each 10 carbon atoms in $R^{1-3}$, and the presence of any such non-hydrocarbon substituents and heteroatoms must be considered in applying the aforementioned ratio of carbon to oxygen and molecular weight limitations. Preferred amide additives consist of carbon, hydrogen, nitrogen and oxygen. Representative $R^1$, $R^2$, $R^3$ and $R^5$ aliphatic and alicyclic hydrocarbon radicals include methyl, ethyl, propyl, isopropyl, butyl, isobutyl, sec-butyl, tert-butyl, pentyl, isopentyl, neopentyl, tert-pentyl, cyclopentyl, cyclohexyl, heptyl, octyl, nonyl, decyl, undecyl, dodecyl and their configurational isomers. Representative $R^1$, $R^2$, $R^3$ and $R^5$ aromatic radicals include phenyl, cumenyl, mesityl, tolyl, xylyl, benzyl, phenethyl, thienyl, furyl, pyrrolyl and pyridyl. A preferred embodiment of amide additives are those wherein $R^4$ in the aforementioned formula cyclo-$[R^4CON(R^5)-]$ may be represented by the hydrocarbylene radical $(CR^6R^7)_n$, in other words, the formula: cyclo-$[(CR^6R^7)_nCON(R^5)-]$ wherein: the previously-stated values for (a) ratio of carbon to oxygen and (b) molecular weight apply; n is an integer from 3 to 5; $R^5$ is a saturated hydrocarbon radical containing 1 to 12 carbon atoms; $R^6$ and $R^7$ are independently selected (for each n) by the rules previously offered defining $R^{1-3}$. In the lactams represented by the formula: cyclo-$[(CR^6R^7)_nCON(R^5)-]$, all $R^6$ and $R^7$ are preferably hydrogen, or contain a single saturated hydrocarbon radical among the n methylene units, and $R^5$ is a saturated hydrocarbon radical containing 3 to 12 carbon atoms. For example, 1-(saturated hydrocarbon radical)-5-methylpyrrolidin-2-ones.

Representative amide additives include: 1-octylpyrrolidin-2-one, 1-decylpyrrolidin-2-one, 1-octyl-5-methylpyrrolidin-2-one, 1-butylcaprolactam, 1-isobutylcaprolactam, 1-cyclohexylpyrrolidin-2-one, 1-cyclohexyl-5-methylpyrrolidin-2-one, 1-butyl-5-methyl piperid-2-one, 1-pentyl-5-methylpiperid-2-one, 1-hexylcaprolactam, 1-hexyl-5-methylpyrrolidin-2-one, 1-heptyl-5-methylpyrrolidin-2-one, 1-nonyl-5-methylpyrrolidin-2-one, 1-undecyl-5-methylpyrrolidin-2-one, 1-dodecyl-5-methylpyrrolidin-2-one, 5-methyl-1-pentylpiperid-2-one, 1,3-dimethylpiperid-2-one, 1-methylcaprolactam, 1-butyl-pyrrolidin-2-one, 1,5-dimethylpiperid-2-one, 1-decyl-5-methylpyrrolidin-2-one, 1-dodecylpyrrolid-2-one, N,N-dibutylformamide and N,N-diisopropylacetamide.

Additives of the present invention further comprise nitrites represented by the formula $R^1CN$, wherein $R^1$ is selected from aliphatic, alicyclic or aryl hydrocarbon radicals having from 5 to 12 carbon atoms, and wherein said nitriles have a molecular weight of from about 90 to about 200 atomic mass units and a carbon to nitrogen ratio of from about 6 to about 12. $R^1$ in said nitrile additives is preferably selected from aliphatic and alicyclic hydrocarbon radicals having 8 to 10 carbon atoms. The molecular weight of said nitrile additives is preferably from about 120 to about 140 atomic mass units. The carbon to nitrogen ratio in said nitrile additives is preferably from about 8 to about 9. $R^1$ may optionally include substituted hydrocarbon radicals, that is, radicals containing non-hydrocarbon substituents selected from halogens (e.g., fluorine, chlorine) and alkoxides (e.g. methoxy). $R^1$ may optionally include heteroatom-substituted hydrocarbon radicals, that is, radicals which contain the atoms nitrogen (aza-), oxygen (keto-, oxa-) or sulfur (thia-) in a radical chain otherwise composed of carbon atoms. In general, no more than three non-hydrocarbon substituents and heteroatoms, and preferably no more than one, will be present for each 10 carbon atoms in $R^1$, and the presence of any such non-hydrocarbon substituents and heteroatoms must be considered in applying the aforementioned ratio of carbon to nitrogen and molecular weight limitations. Representative $R^1$ aliphatic, alicyclic and aryl hydrocarbon radicals in the general formula $R^1CN$ include pentyl, isopentyl, neopentyl, tert-pentyl, cyclopentyl, cyclohexyl, heptyl, octyl, nonyl, decyl, undecyl, dodecyl and their configurational isomers, as well as phenyl, benzyl, cumenyl, mesityl, tolyl, xylyl and phenethyl.

Representative nitrile additives include: 1-cyanopentane, 2,2-dimethyl-4-cyanopentane, 1-cyanohexane, 1-cyanoheptane, 1-cyanooctane, 2-cyanooctane, 1-cyanononane, 1-cyanodecane, 2-cyanodecane, 1-cyanoundecane and 1-cyanododecane.

Additives of the present invention further comprise chlorocarbons represented by the formula $RCl_x$, wherein; x is selected from the integers 1 or 2; R is selected from aliphatic and alicyclic hydrocarbon radicals having 1 to 12 carbon atoms; and wherein said chlorocarbons have a molecular weight of from about 100 to about 200 atomic mass units and carbon to chlorine ratio from about 2 to about 10. The molecular weight of said chlorocarbon additives is preferably from about 120 to 150 atomic mass units. The carbon to chlorine ratio in said chlorocarbon additives is preferably from about 6 to about 7. Representative R aliphatic and alicyclic hydrocarbon radicals in the general formula $RCl_x$ include methyl, ethyl, propyl, isopropyl, butyl, isobutyl, sec-butyl, tert-butyl, pentyl, isopentyl, neopentyl, tert-pentyl, cyclopentyl, cyclohexyl, heptyl, octyl, nonyl, decyl, undecyl, dodecyl and their configurational isomers.

Representative chlorocarbon additives include: 3-(chloromethyl)pentane, 3-chloro-3-methylpentane, 1-chlorohexane, 1,6-dichlorohexane, 1-chloroheptane, 1-chlorooctane, 1-chlorononane, 1-chlorodecane, and 1,1,1-trichlorodecane.

Additives of the present invention further comprise aryl ethers represented by the formula $R^1OR^2$, wherein: $R^1$ is selected from aryl hydrocarbon radicals having from 6 to 12 carbon atoms; $R^2$ is selected from aliphatic hydrocarbon radicals having from 1 to 4 carbon atoms; and wherein said aryl ethers have a molecular weight of from about 100 to about 150 atomic mass units and a carbon to oxygen ratio of from about 4 to about 20. The carbon to oxygen ratio in said aryl ether additives is preferably from about 7 to about 10. Representative $R^1$ aryl radicals in the general formula $R^1OR^2$ include phenyl, biphenyl, cumenyl, mesityl, tolyl, xylyl, naphthyl and pyridyl. Representative $R^2$ aliphatic hydrocarbon radicals in the general formula $R^1OR^2$ include methyl, ethyl, propyl, isopropyl, butyl, isobutyl, sec-butyl and tert-butyl. Representative aromatic ether additives include: methyl phenyl ether (anisole), 1,3-dimethyoxybenzene, ethyl phenyl ether and butyl phenyl ether.

Additives of the present invention further comprise 1,1,1-trifluoroalkanes represented by the general formula $CF_3R^1$, wherein $R^1$ is selected from aliphatic and alicyclic hydrocarbon radicals having from about 5 to about 15 carbon atoms, preferably primary, linear, saturated, alkyl radicals. Representative 1,1,1-trifluoroalkane additives include: 1,1,1-trifluorohexane and 1,1,1-trifluorododecane.

Additives of the present invention further comprise fluoroethers represented by the general formula $R^1OCF_2CF_2H$, wherein $R^1$ is selected from aliphatic and alicyclic hydrocarbon radicals having from about 5 to about 15 carbon atoms, preferably primary, linear, saturated, alkyl radicals. Representative fluoroether additives include: $C_8H_{17}OCF_2CF_2H$ and $C_6H_{13}OCF_2CF_2H$.

Additives of the present invention further comprise lactones represented by formulas I, II, and III:

These lactones contain the functional group —$CO_2$— in a ring of six (I), or preferably five atoms (II), wherein for I and II, $R_1$ through $R_8$ are independently selected from hydrogen or linear, branched, cyclic, bicyclic, saturated and unsaturated hydrocarbyl radicals. Each $R_1$ though $R_8$ may be connected forming a ring with another $R_1$ through $R_8$. The lactone may have an exocyclic alkylidene group as in formula III, wherein $R_1$ through $R_6$ are independently selected from hydrogen or linear, branched, cyclic, bicyclic, saturated and unsaturated hydrocarbyl radicals. Each $R_1$ though $R_6$ may be connected forming a ring with another $R_1$ through $R_6$. The lactone additives of the present invention have a carbon to ester functional group carbonyl oxygen ratio from about 5 to about 15, preferred from about 5 to about 12. Said lactone additives also have a molecular weight range of from about 80 to about 300 atomic mass units, preferred from about 80 to about 200 atomic mass units. Representative lactone additives include the compounds listed in the table below.

| Additive | Molecular Structure | Molecular Formula | Molecular Weight (amu) | Carbon to Carbonyl Oxygen Ratio |
|---|---|---|---|---|
| (E,Z)-3-ethylidene-5-methyl-dihydro-furan-2-one | | $C_7H_{10}O_2$ | 126 | 7 |

-continued

| Additive | Molecular Structure | Molecular Formula | Molecular Weight (amu) | Carbon to Carbonyl Oxygen Ratio |
|---|---|---|---|---|
| (E,Z)-3-propylidene-5-methyl-dihydro-furan-2-one | | $C_8H_{12}O_2$ | 140 | 8 |
| (E,Z)-3-butylidene-5-methyl-dihydro-furan-2-one | | $C_9H_{14}O_2$ | 154 | 9 |
| (E,Z)-3-pentylidene-5-methyl-dihydro-furan-2-one | | $C_{10}H_{16}O_2$ | 168 | 10 |
| (E,Z)-3-Hexylidene-5-methyl-dihydro-furan-2-one | | $C_{11}H_{18}O_2$ | 182 | 11 |
| (E,Z)-3-Heptylidene-5-methyl-dihydro-furan-2-one | | $C_{12}H_{20}O_2$ | 196 | 12 |
| (E,Z)-3-octylidene-5-methyl-dihydro-furan-2-one | | $C_{13}H_{22}O_2$ | 210 | 13 |
| (E,Z)-3-nonylidene-5-methyl-dihydro-furan-2-one | | $C_{14}H_{24}O_2$ | 224 | 14 |
| (E,Z)-3-decylidene-5-methyl-dihydro-furan-2-one | | $C_{15}H_{26}O_2$ | 238 | 15 |
| (E,Z)-3-(3,5,5-trimethylhexylidene)-5-methyl-dihydrofuran-2-one | | $C_{14}H_{24}O_2$ | 224 | 14 |
| (E,Z)-3-cyclohexylmethylidene-5-methyl-dihydrofuran-2-one | | $C_{12}H_{18}O_2$ | 194 | 12 |
| gamma-valerolactone | | $C_5H_8O_2$ | 100 | 5 |
| gamma-octalactone | | $C_8H_{14}O_2$ | 142 | 8 |
| gamma-nonalactone | | $C_9H_{16}O_2$ | 156 | 9 |

-continued

| Additive | Molecular Structure | Molecular Formula | Molecular Weight (amu) | Carbon to Carbonyl Oxygen Ratio |
| --- | --- | --- | --- | --- |
| gamma-decalactone | | $C_{10}H_{18}O_2$ | 170 | 10 |
| gamma-undecalactone | | $C_{11}H_{20}O_2$ | 184 | 11 |
| gamma-dodecalactone | | $C_{12}H_{22}O_2$ | 198 | 12 |
| 3-hexyldihydro-furan-2-one | | $C_{10}H_{18}O_2$ | 170 | 10 |
| 3-heptyldihydro-furan-2-one | | $C_{11}H_{20}O_2$ | 184 | 11 |
| cis-3-ethyl-5-methyl-dihydro-furan-2-one | | $C_7H_{12}O_2$ | 128 | 7 |
| cis-(3-propyl-5-methyl)-dihydro-furan-2-one | | $C_8H_{14}O_2$ | 142 | 8 |
| cis-(3-butyl-5-methyl)-dihydro-furan-2-one | | $C_9H_{16}O_2$ | 156 | 9 |
| cis-(3-pentyl-5-methyl)-dihydro-furan-2-one | | $C_{10}H_{18}O_2$ | 170 | 10 |
| cis-3-hexyl-5-methyl-dihydro-furan-2-one | | $C_{11}H_{20}O_2$ | 184 | 11 |

-continued

| Additive | Molecular Structure | Molecular Formula | Molecular Weight (amu) | Carbon to Carbonyl Oxygen Ratio |
| --- | --- | --- | --- | --- |
| cis-3-heptyl-5-methyl-dihydro-furan-2-one | | $C_{12}H_{22}O_2$ | 198 | 12 |
| cis-3-octyl-5-methyl-dihydro-furan-2-one | | $C_{13}H_{24}O_2$ | 212 | 13 |
| cis-3-(3,5,5-trimethylhexyl)-5-methyl-dihydro-furan-2-one | | $C_{14}H_{26}O_2$ | 226 | 14 |
| cis-3-cyclohexylmethyl-5-methyl-dihydro-furan-2-one | | $C_{12}H_{20}O_2$ | 196 | 12 |
| 5-methyl-5-hexyl-dihydro-furan-2-one | | $C_{11}H_{20}O_2$ | 184 | 11 |
| 5-methyl-5-octyl-dihydro-furan-2-one | | $C_{13}H_{24}O_2$ | 212 | 13 |
| Hexahydro-isobenzofuran-1-one | | $C_8H_{12}O_2$ | 140 | 8 |
| delta-decalactone | | $C_{10}H_{18}O_2$ | 170 | 10 |
| delta-undecalactone | | $C_{11}H_{20}O_2$ | 184 | 11 |

-continued

| Additive | Molecular Structure | Molecular Formula | Molecular Weight (amu) | Carbon to Carbonyl Oxygen Ratio |
|---|---|---|---|---|
| delta-dodecalactone |  | $C_{12}H_{22}O_2$ | 198 | 12 |
| mixture of 4-hexyl-dihydrofuran-2-one and 3-hexyl-dihydro-furan-2-one |  | $C_{10}H_{18}O_2$ | 170 | 10 |

The lactone additives generally have a kinematic viscosity of less than about 7 centistokes at 40° C. For instance, gamma-undecalactone has kinematic viscosity of 5.4 centistokes and cis-(3-hexyl-5-methyl)dihydrofuran-2-one has viscosity of 4.5 centistokes at 40° C. Lactone additives may be available commercially or prepared by methods as described in the concurrently filed U.S. provisional patent application, Ser. No. 60/494,010, entitled "cis-3,5-Disubstituted-dihydro-furan-2-ones and the Preparation and Use Thereof". The inventors of this provisional application are P. J. Fagan and C. J. Brandenburg. The aforesaid provisional application is incorporated herein by reference.

Additives of the present invention further comprise esters represented by the general formula $R^1CO_2R^2$, wherein $R^1$ and $R^2$ are independently selected from linear and cyclic, saturated and unsaturated, alkyl and aryl radicals. Preferred esters consist essentially of the elements C, H and O, have a molecular weight of from about 80 to about 550 atomic mass units, and have a carbon to ester functional group carbonyl oxygen ratio of from about 5 to about 15. Representative esters include: $(CH_3)_2CHCH_2OOC(CH_2)_{2-4}OCOCH_2CH(CH_3)_2$ (diisobutyl dibasic ester), ethyl hexanoate, ethyl heptanoate, n-butyl propionate, n-propyl propionate, ethyl benzoate, di-n-propyl phthalate, benzoic acid ethoxyethyl ester, dipropyl carbonate, "Exxate 700" (a commercial $C_7$ alkyl acetate), "Exxate 800" (a commercial $C_8$ alkyl acetate), dibutyl phthalate, and tert-butyl acetate.

Additives of the present invention further comprise crown compounds with the repeating unit $-(CH_2-CH_2-Y)_n-$ joined in a circular structure, wherein Y is a heteroatom, such as oxygen, nitrogen or sulfur, and n is greater than 2. Preferred crown compounds are crown ethers wherein Y is oxygen and n is greater than 4. Additionally, the crown compounds may be optionally substituted with side groups containing carbon, hydrogen, oxygen, nitrogen and/or halogen atoms. Crown ethers are available commercially from chemical supply companies such as Aldrich. Representative crown ethers are 18-crown-6 ether, 15-crown-5 ether, and 12-crown-4 ether.

Additives of the present invention further comprise cyclodextrins wherein the repeating units represented by formula IV are connected in a circular structure:

$$IV$$

In formula IV, each R group is independently selected from hydrogen or linear, branched, cyclic, bicyclic, saturated and unsaturated hydrocarbyl radicals having up to 10 carbon atoms and n is equal to 6 (alpha-cyclodextrin), 7 (beta-cyclodextrin) or 8 (gamma-cyclodextrin). As an example of a substituted cyclodextrin, perhexyl-beta-cyclodextrin is a cyclodextrin compound comprising 7 repeating units (n=7) and wherein all R groups comprise hexyl radicals.

Additives of the present invention further comprise calixarenes wherein the repeating units represented by formula V are connected in a circular structure:

$$V$$

In formula V, each $R_1$ and $R_2$ group is independently selected from hydrogen or linear, branched, cyclic, bicyclic, saturated and unsaturated hydrocarbyl radicals having up to 10 carbon atoms and n=4, 5, 6, 7, or 8. Representative calixarenes are calix[4]arene, calix[6]arene, and para-tert-butyl-calix[4]arene, wherein n=4, $R_1$ comprises hydrogen, and $R_2$ comprises a tert-butyl radical.

Additives of the present invention may comprise a single additive species or multiple additive species together in any proportion. For example, an additive may comprise a mixture of compounds from within a single additive species (e.g. a mixture of polyoxyalkylene glycol ethers) or a mixture of compounds chosen from different additive species (e.g. a mixture of a polyoxyalkylene glycol ether with an amide).

Additives of the present invention may optionally further comprise ketones represented by the formula $R^1COR^2$, wherein $R^1$ and $R^2$ are independently selected from aliphatic, alicyclic and aryl hydrocarbon radicals having from 1 to 12 carbon atoms, and wherein said ketones have a molecular weight of from about 70 to about 300 atomic mass units and a carbon to oxygen ratio of from about 4 to about 13. $R^1$ and $R^2$ in said ketones are preferably independently selected from aliphatic and alicyclic hydrocarbon radicals having 1 to 9 carbon atoms. The molecular weight of said ketones is preferably from about 100 to 200 atomic mass units. The carbon to oxygen ratio in said ketones is preferably from about 7 to about 10. $R^1$ and $R^2$ may together form a hydrocarbylene radical connected and forming a five, six, or seven-membered ring cyclic ketone, for example, cyclopentanone, cyclohexanone, and cycloheptanone. $R^1$ and $R^2$ may optionally include substituted hydrocarbon radicals, that is, radicals containing non-hydrocarbon substituents selected from halogens (e.g., fluorine, chlorine) and alkoxides (e.g. methoxy). $R^1$ and $R^2$ may optionally include heteroatom-substituted hydrocarbon radicals, that is, radicals which contain the atoms nitrogen (aza-), oxygen (keto-, oxa-) or sulfur (thia-) in a radical chain otherwise composed of carbon atoms. In general, no more than three non-hydrocarbon substituents and heteroatoms, and preferably no more than one, will be present for each 10 carbon atoms in $R^1$ and $R^2$, and the presence of any such non-hydrocarbon substituents and heteroatoms must be considered in applying the aforementioned ratio of carbon to oxygen and molecular weight limitations. Representative $R^1$ and $R^2$ aliphatic, alicyclic and aryl hydrocarbon radicals in the general formula $R^1COR^2$ include methyl, ethyl, propyl, isopropyl, butyl, isobutyl, sec-butyl, tert-butyl, pentyl, isopentyl, neopentyl, tert-pentyl, cyclopentyl, cyclohexyl, heptyl, octyl, nonyl, decyl, undecyl, dodecyl and their configurational isomers, as well as phenyl, benzyl, cumenyl, mesityl, tolyl, xylyl and phenethyl.

Representative ketone additives include: 2-butanone, 2-pentanone, acetophenone, butyrophenone, hexanophenone, cyclohexanone, cycloheptanone, 2-heptanone, 3-heptanone, 5-methyl-2-hexanone, 2-octanone, 3-octanone, diisobutyl ketone, 4-ethylcyclohexanone, 2-nonanone, 5-nonanone, 2-decanone, 4-decanone, 2-decalone, 2-tridecanone, dihexyl ketone and dicyclohexyl ketone.

Ketone additives may have an objectionable odor, which can be masked by addition of an odor masking agent or fragrance. Typical examples of odor masking agents or fragrances may include Evergreen, Fresh Lemon, Cherry, Cinnamon, Peppermint, Floral or Orange Peel or sold by Intercontinental Fragrance, as well as d-limonene and pinene. Such odor masking agents may be used at concentrations of from about 0.001% to as much as about 15% by weight based on the combined weight of odor masking agent and additive.

Additives of the present invention may optionally further comprise from about 0.5 to about 50 weight percent (based on total amount of additive) of a linear or cyclic aliphatic or aromatic hydrocarbon containing from 5 to 15 carbon atoms. Representative hydrocarbons include pentane, hexane, octane, nonane, decane, Isopar® H (a high purity $C_{11}$ to $C_{12}$ iso-paraffinic), Aromatic 150 (a $C_9$ to $C_{11}$ aromatic), Aromatic 200 (a $C_9$ to $C_{15}$ aromatic) and Naptha 140. All of these hydrocarbons are sold by Exxon Chemical, USA.

Additives of the present invention may optionally further comprise polymeric additives. The polymeric additive may be a random copolymer of fluorinated and non-fluorinated acrylates, wherein the polymer comprises repeating units of at least one monomer represented by the formulae $CH_2=C(R^1)CO_2R^2$, $CH_2=C(R^3)C_6H_4R^4$, and $CH_2=C(R^5)C_6H_4XR^6$, wherein X is oxygen or sulfur; $R^1$, $R^3$, and $R^5$ are independently selected from the group consisting of H and $C_1-C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups. Examples of such polymeric additives include those disclosed in U.S. Pat. No. 6,299,792, such as Zonyl® PHS sold by E. I. du Pont de Nemours & Co., Wilmington, Del., 19898, USA. Zonyl® PHS is a random copolymer made by polymerizing 40 weight percent $CH_2=C(CH_3)CO_2CH_2CH_2(CF_2CF_2)_mF$ (also referred to as Zonyl® fluoromethacrylate or ZFM) wherein m is from 1 to 12, primarily 2 to 8, and 60 weight percent lauryl methacrylate $(CH_2=C(CH_3)CO_2(CH_2)_{11}CH_3$, also referred to as LMA).

Additives of the present invention may optionally further contain from about 0.01 to 30 weight percent (based on total amount of additive) of an additive which reduces the surface energy of metallic copper, aluminum, steel, or other metals found in heat exchangers in a way that reduces the adhesion of lubricants to the metal. Examples of metal surface energy reducing additives include those disclosed in WIPO PCT publication WO 96/7721, such as Zonyl® FSA, Zonyl® FSP, Zonyl® FSJ and Zonyl® FS62, all products of E. I. du Pont de Nemours and Co. In practice, by reducing the adhesive forces between the metal and the lubricant (i.e. substituting for a compound more tightly bound to the metal), the lubricant circulates more freely through the heat exchangers and connecting tubing in an air conditioning or refrigeration system, instead of remaining as a layer on the surface of the metal. This allows for the increase of heat transfer to the metal and allows efficient return of lubricant to the compressor.

Commonly used refrigeration system additives may optionally be added, as desired, to compositions of the present invention in order to enhance lubricity and system stability. These additives are generally known within the field of refrigeration compressor lubrication, and include anti wear agents, extreme pressure lubricants, corrosion and oxidation inhibitors, metal surface deactivators, free radical scavengers, foaming and antifoam control agents, leak detectants and the like. In general, these additives are present only in small amounts relative to the overall lubricant composition. They are typically used at concentrations of from less than about 0.1% to as much as about 3% of each additives. These additives are selected on the basis of the individual system requirements. Some typical examples of such additives may include, but are not limited to, lubrication enhancing additives, such as alkyl or aryl esters of phosphoric acid and of thiophosphates. These include members of the triaryl phosphate family of EP lubricity additives, such as butylated triphenyl phosphates (BTPP), or other alkylated triaryl phosphate esters, e.g. Syn-0-Ad 8478 from Akzo Chemicals, tricresyl phosphates and related compounds. Additionally, the metal dialkyl dithiophosphates (e.g. zinc dialkyl dithiophosphate or ZDDP, Lubrizol 1375) and other members of this family of chemicals may be used in compositions of the present invention. Other antiwear additives include natural product oils and asymmetrical polyhydroxyl lubrication additives such as Synergol TMS (International Lubricants). Natural or synthetic oil-based lubricity enhancing agents may include products such as Zerol ICE from Nu-Calgon, Inc. Similarly, stabilizers such as anti oxidants, free radical scavengers, and water scavengers may be employed. Compounds in this category can include, but are not limited to, butylated hydroxy toluene (BHT), epoxides, and glycidyl ethers.

The present invention further comprises a method of producing refrigeration in a compression refrigeration system containing a HFC, PFC, HFE, ammonia and/or carbon dioxide refrigerant and a refrigeration lubricant selected from the group consisting of POEs, PAGs, and PVEs. The method comprises the step of contacting said lubricant with said refrigerant in the presence of an effective amount of the present additive in said compression refrigeration system.

The present invention further comprises a method of lubricating a compressor in a compression refrigeration apparatus containing HFC, PFC, HFE, ammonia and/or carbon dioxide refrigerant. The method of lubricating comprises the step of adding to said compressor a lubricant and additive composition of the present invention.

The present invention further comprises a process for producing refrigeration in vapor compression refrigeration or air-conditioning systems comprising condensing the present refrigerant compositions, and thereafter evaporating said compositions in the vicinity of a body to be cooled.

The present invention further comprises a process for producing heat comprising condensing the present refrigerant compositions in the presence of a body to be heated, and thereafter evaporating said compositions.

The present invention further comprises a method for improving the energy efficiency and/or capacity of a compression refrigeration apparatus, which comprises the step of using a refrigerant composition of the present invention in a compression refrigeration apparatus.

The present invention further comprises a method for reducing deposits and pluggage in a compression refrigeration and/or air-conditioning apparatus comprising the step of using a composition of the present invention in said apparatus.

The present invention further comprises a method for delivering an additive to a compression refrigeration apparatus, comprising the step of adding any of the compositions of the present invention to said apparatus.

The compositions of the present invention may further be used as cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents or displacement drying agents.

EXAMPLES

"POE 22" is used herein as an abbreviation for Mobil Oil product Arctic EAL22, a polyol ester lubricant having a kinematic viscosity of 22 centistokes at 40° C. "DMM" used herein is an abbreviation for dipropylene glycol dimethyl ether ($CH_3O[CH_2CH(CH_3)O]_2CH_3$). "OP" used herein is an abbreviation for 1-octyl pyrrolidin-2-one ($C_{12}H_{23}NO$).

"HDFO" used herein is an abbreviation for a 1:1 mixture of 4-hexyl-dihydrofuran-2-one and 3-hexyl-dihydrofuran-2-one. DMM, OP, gamma-valerolactone, gamma-octalactone, gamma-nonalactone, gamma-decalactone, gamma-undecalactone, tetraglyme, 1-methylcaprolactam, 18-crown-6 ether, tert-butyl acetate, N-butylpropionate, N,N-dibutylformamide, and 2-octanone are available from Aldrich Chemical Company (Milwaukee, Wis.). The synthesis of 1-butyl-caprolactam may be carried out as described in the art.

Example 1

Tests were conducted to measure temperature rise during mixing of HFC and additives of the present invention. Equal volumes of additives and HFC-43-10mee (CF3CF2CHFCHFCF3) were mixed in an insulated Dewar flask outfitted with a temperature probe. Temperature rise was recorded 5 seconds after mixing. Results are shown below.

Example 1

Temperature Rise

| | Initial T (° C.) | Final T (° C.) | Temp Rise (° C.) |
|---|---|---|---|
| Comparative Example | | | |
| tetraglyme | 21.7 | 35 | 13.9 |
| Examples | | | |
| 1-methylcaprolactam | 22.15 | 35.7 | 13.55 |
| 1-butylcaprolactam | 21.1 | 32.45 | 11.35 |
| 18-Crown-6 ether | 22.45 | 33.2 | 10.75 |
| n-octyl pyrrolidin-2-one (OP) | 20.1 | 30.75 | 10.65 |
| Dipropylene glycol dimethyl ether (DMM) | 20.7 | 29.65 | 8.95 |
| gamma-valerolactone | 21.35 | 30.2 | 8.85 |
| Tert-butyl acetate | 19.7 | 28.2 | 8.5 |
| 2-heptanone | 20.75 | 28.15 | 7.4 |
| gamma-octalactone | 21 | 28.3 | 7.3 |
| N,N-dibutylformamide | 22.25 | 29.1 | 6.85 |
| N-butylpropionate | 21 | 27.7 | 6.7 |
| 2-nonanone | 21.00 | 27.60 | 6.6 |
| gamma-nonalactone | 21.1 | 27.5 | 6.4 |
| gamma-undecalactone (GUDL) | 19.7 | 25.8 | 6.1 |
| HDFO | 20.00 | 25.95 | 5.95 |
| 2-octanone | 19.75 | 25.5 | 5.75 |
| gamma-decalactone | 21.15 | 26.45 | 5.3 |

Results indicate compositions of the present invention have significant temperature rise indicating high heat of mixing.

Example 2

A refrigerant cylinder and a flat bottom vessel are connected by a short manifold including isolation valves, a fill port, and a pressure transducer. The volume of the entire assembly is pre-determined by mass of water to fill. A known volume of POE 22 lubricant with or without additive (OP or DMM) is charged into the flat bottom vessel at 22° C. Air is evacuated from the headspace. The isolation valve between the two cylinders is closed. HFC-134a refrigerant is loaded into the other cylinder up to a pressure of 181 kPa.

Figure 1:
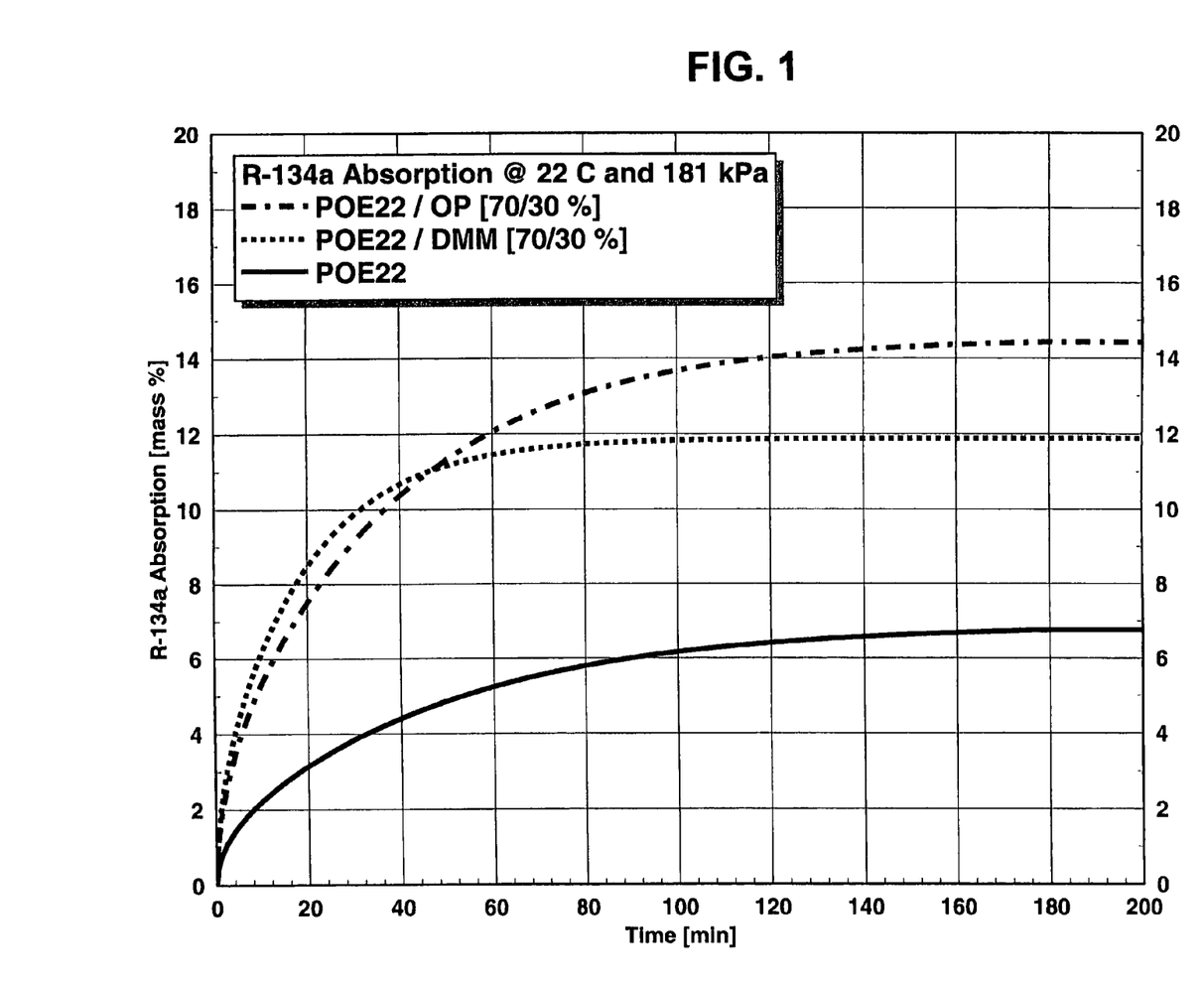
FIG. 1 is a graph of HFC-134a absorption (mass %) versus time for POE 22 (Mobil Oil product Arctic EAL 22), and the compositions: 70 wt % POE 22, 30 wt % 1-octyl pyrrolidin-2-one (OP); and 70 wt % POE 22, 30 wt % dipropylene glycol dimethyl ether (DMM) as described in Example 2.

The pressure is continuously monitored as the isolation valve between the two cylinders is opened. Over a period of time, the pressure in the system decreases as the refrigerant gas is absorbed into the lubricant phase. An equation of state was used to translate the reduced pressure into mass percent of refrigerant absorbed into the lubricant/additive mixture. Results are shown in FIG. 1. The results indicate that HFC-134a absorption into POE 22 is significantly improved through the addition of additives of the present invention. This result is indicative of an improvement in heat of vaporization.

Example 3

Tests were conducted to determine if the additive could improve performance of R407C (23 wt % HFC-32 and 25 wt % HFC-125, 52 wt % HFC-134a) and polyol ester (POE) oil. A ductless split R22 Sanyo heat pump (evaporator Model KHSO951, condenser Model CHO951) was installed in an environmental chamber. The heat pump was outfitted with an R22 Sanyo rotary compressor (C-1R75H2R). The fan-coil unit was installed in the indoor room of an environmental chamber and the outdoor unit was installed in the outdoor room. The system was charged with about 1200 grams of R407C and 350 ml of POE oil with a viscosity at 40° C. of 46 centistokes. Tests were conducted at ASHRAE cooling B conditions where the indoor room was controlled at 80° F. and 67° F. wet bulb temperature, the outdoor room at 82° F. and 65° F. wet bulb temperature. Tests were also conducted at ASHRAE heating conditions where the indoor room was controlled at 70° F. and 60° F. wet bulb temperature, the outdoor room at 17° F. and 15° F. wet bulb temperature relative humidity. Air side capacity, energy efficiency ratio (EER) measurements and oil volume measurements were made. After the R407C/POE baseline, the oil charge was removed and replaced with additive in POE RL68H so that final oil viscosity at 40° C. was comparable to the baseline POE oil. Again, cooling B measurements and low temperature heating measurements were made. Capacity and energy efficiency results are shown below.

Example 3

Cooling B Test

| Oil Composition | Viscosity at 40° C. (cs) | Capacity (Kbtu/H) | EER |
| --- | --- | --- | --- |
| R407C/50 wt % POE Emkarate RL32CF/50 wt % POE RL 68H | 46 | 5.91 | 7.59 |
| R407C/10% tetraglyme in POE RL68H | 37 | 5.68 | 7.41 |
| R407C/10 wt % n-octyl pyrrolidin-2-one in POE RL68H | 46 | 6.51 | 8.23 |

Example 3

Low Temperature Heating Test

| Oil Composition | Viscosity at 40° C. (cs) | Capacity (Kbtu/H) | EER |
| --- | --- | --- | --- |
| R407C/50 wt % POE Emkarate RL32CF/50 wt % POE RL 68H | 46 | 3.71 | 4.57 |
| R407C/10% tetraglyme in POE RL68H | 37 | 2.92 | 3.66 |
| R407C/10 wt % n-octyl pyrrolidin-2-one in POE RL68H | 46 | 4.01 | 4.81 |

Results show significantly increased energy efficiency and capacity when n-octyl-pyrrolidin-2-one is added to R407C/POE. Performance is surprisingly improved versus tetraglyme.

Example 4

Tests were conducted to determine if HFC-134a/POE performance could be improved in a domestic refrigerator (Frigidaire 21 cubic foot, Model FRT21P5) using additives of the present invention. The refrigerator was outfitted with pressure and temperature measuring devices as well as power measurement to the hermetic reciprocating compressor and two fans. The compressor was also fitted with a sight glass to monitor lubricant level during operation. The refrigerator was tested in a room controlled at 32.2° C. The refrigerated and freezer compartments were tested at two conditions, mid-mid and warm-warm. The compartment temperatures were monitored and the integrated daily power requirement was calculated. The system was thoroughly flushed between runs to remove residual lubricant. Results are shown below.

Example 4

Mid-Mid Compartment Temperature Conditions

| Lubricant Composition | Oil viscosity at 40° C. (cs) | Integrated daily power requirement (kWhr/day) | Freezer compartment temperature (° F.) | Refrigerated compartment temperature (° F.) |
| --- | --- | --- | --- | --- |
| R134a/POE 10 | 10.0 | 1.49 | 3.9 | 37.4 |
| R134a/10% tetraglyme in POE 10 | 9.0 | 1.49 | 5.1 | 37.4 |
| R134a/15% n-octyl pyrrolidin-2-one in POE 10 | 9.3 | 1.47 | 3.8 | 37.6 |

Example 4

Warm-Warm Compartment Temperature Conditions

| Lubricant Composition | Oil viscosity at 40° C. (cs) | Integrated daily power requirement (kWhr/day) | Freezer compartment temperature (° F.) | Refrigerated compartment temperature (° F.) |
|---|---|---|---|---|
| R134a/POE 10 | 10.0 | 1.26 | 9.6 | 44.5 |
| R134a/10% tetraglyme in POE 10 | 9.0 | 1.26 | 11.0 | 44.7 |
| R134a/15% n-octyl pyrrolidin-2-one in POE 10 | 9.3 | 1.21 | 10.0 | 44.5 |

Results show an improvement in energy efficiency when n-octyl pyrrolidin-2-one is added to R134a/POE 10. N-octyl pyrrolidin-2-one performance is also surprisingly improved versus tetraglyme.

What is claimed is:

1. A composition comprising:
   (a) at least one POE refrigeration lubricant; and
   (b) at least one additive comprising an amide represented by the formula cyclo-[$R^4$CON($R^5$)—], wherein $R^5$ is selected from aliphatic and alicyclic hydrocarbon radicals having from 1 to 12 carbon atoms; $R^4$ is selected from aliphatic hydrocarbylene radicals having from 3 to 12 carbon atoms; and wherein said amide has a molecular weight of from about 120 to about 300 atomic mass units and a carbon to oxygen ratio of from about 7 to about 20.

2. The composition of claim 1, wherein said lubricant is from about 40 to about 99 weight percent and said additive is from about 1 to about 60 weight percent.

3. The composition of claim 1, wherein said lubricant is from about 80 to about 99 weight percent and said additive is from about 1 to about 20 weight percent.

4. A method of lubricating a compressor in a compression refrigeration and/or air-conditioning apparatus containing HFC, PFC, HFE, ammonia and/or carbon dioxide, comprising the step of adding to said compressor the composition of claim 1.

5. A composition comprising:
   (a) at least one refrigerant selected from the group consisting of hydrofluorocarbons, perfluorocarbons, hydrofluoroethers, ammonia and carbon dioxide;
   (b) at least one POE refrigeration lubricant; and
   (c) at least one additive comprising an amide represented by the formula cyclo-[$R^4$CON($R^5$)—], wherein $R^5$ is selected from aliphatic and alicyclic hydrocarbon radicals having from 1 to 12 carbon atoms; $R^4$ is selected from aliphatic hydrocarbylene radicals having from 3 to 12 carbon atoms; and wherein said amide has a molecular weight of from about 120 to about 300 atomic mass units and a carbon to oxygen ratio of from about 7 to about 20.

6. A composition for use in compression refrigeration and air conditioning apparatus containing POE lubricant, said refrigerant composition comprising:
   (a) at least one refrigerant selected from the group consisting of hydrofluorocarbons, perfluorocarbons, hydrofluoroethers, ammonia and carbon dioxide; and
   (b) at least one additive comprising an amide represented by the formula cyclo-[$R^4$CON($R^5$)—], wherein $R^5$ is selected from aliphatic and alicyclic hydrocarbon radicals having from 1 to 12 carbon atoms; $R^4$ is selected from aliphatic hydrocarbylene radicals having from 3 to 12 carbon atoms; and wherein said amide has a molecular weight of from about 120 to about 300 atomic mass units and a carbon to oxygen ratio of from about 7 to about 20.

7. A process for producing refrigeration, comprising condensing a composition of claim 5 or 6, and thereafter evaporating said composition in the vicinity of a body to be cooled.

8. The process of claim 7, wherein said amide has a molecular weight of from about 120 to about 250 atomic mass units and a carbon to oxygen ratio of from about 7 to about 16.

9. A process for producing heat, comprising condensing a composition of claim 5 or 6 in the vicinity of a body to be heated, and thereafter evaporating said composition.

10. The process of claim 9, wherein said amide has a molecular weight of from about 120 to about 250 atomic mass units and a carbon to oxygen ratio of from about 7 to about 16.

11. The composition of claim 1, 5 or 6, wherein said amide has a molecular weight of from about 120 to about 250 atomic mass units and a carbon to oxygen ratio of from about 7 to about 16.

12. A method for using the composition of claim 1, 5, or 6 to deliver an additive to a compression refrigeration or air-conditioning apparatus, comprising the step of adding said composition to said compression refrigeration or air-conditioning apparatus.

13. A method for using the composition of claim 1, 5, or 6 to reduce deposits and pluggage in a compression refrigeration or air-conditioning apparatus comprising the step of adding said composition to said compression refrigeration or air-conditioning apparatus.

14. A method of producing refrigeration with compression refrigeration and/or air-conditioning systems containing HFC, PFC, HFE, ammonia and/or carbon dioxide refrigerant, and a POE refrigeration lubricant, which comprises the step of evaporating said refrigerant with said lubricant in the presence of an effective amount of additive comprising an amide represented by the formula cyclo-[$R^4$CON($R^5$)—], wherein $R^5$is selected from aliphatic and alicyclic hydrocarbon radicals having from 1 to 12 carbon atoms; $R^4$ is selected from aliphatic hydrocarbylene radicals having from 3 to 12 carbon atoms; and wherein said amide has a molecular weight of from about 120 to about 300 atomic mass units and a carbon to oxygen ratio of from about 7 to about 20.

15. A method for improving the energy efficiency and/or capacity of a compression refrigeration and/or air-conditioning apparatus containing a refrigeration composition comprising at least one refrigerant selected from the group consisting of hydrofluorocarbons, perfluorocarbons, hydrofluoroethers, ammonia and carbon dioxide; and at least one POE refrigeration lubricant; said method comprises the step of adding to said compression refrigeration and/or air-conditioning apparatus at least one additive comprising an amide represented by the formula cyclo-[$R^4$CON($R^5$)—], wherein $R^5$ is selected from aliphatic and alicyclic hydrocarbon radicals having from 1 to 12 carbon atoms; $R^4$ is selected from aliphatic hydrocarbylene radicals having from 3 to 12 carbon atoms; and wherein said amide has a molecular weight of from about 120 to about 300 atomic mass units and a carbon to oxygen ratio of from about 7 to about 20.

16. The method of claim 14, 4 or 15, wherein said amide has a molecular weight of from about 120 to about 250 atomic mass units and a carbon to oxygen ratio of from about 7 to about 16.

17. A composition for use in compression refrigeration and air conditioning apparatus containing POE lubricant said refrigerant composition comprising (a) at least one refrigerant selected from the group consisting of hydrofluorocarbons, perfluorocarbons, hydrofluoroethers, ammonia and carbon dioxide; and at least one additive comprising an amide; wherein the amide is represented by the formula cyclo-$[(CR^6R^7)_n CON(R^5)-]$, wherein n is selected from integers from 3 to 5, $R^6$ and $R^7$ are hydrogen or contain a single saturated hydrocarbon radical among the n methylene units, and $R^5$ is selected from saturated hydrocarbon radicals containing from 1 to 12 carbon atoms, and where said amide has a molecular weight of from about 160 to about 250 atomic mass units and a carbon to oxygen ratio of from about 7 to about 16.

18. A method of producing refrigeration with compression refrigeration and/or air-conditioning systems containing HFC, PFC, HFE, ammonia and/or carbon dioxide refrigerant and a POE refrigeration lubricant, which comprises the step of evaporating said refrigerant with said lubricant in the presence of an effective amount of additive, wherein said additive is selected from the group consisting of amides represented by the formula cyclo-$[R^4CON(R^5)-]$, $R^5$ wherein is selected from aliphatic and alicyclic hydrocarbon radicals having from 1 to 12 carbon atoms; $R^4$ is represented by the hydrocarbylene radical $(CR^5R^7)_n$, wherein n is selected from integers from 3 to 5, $R^6$ and $R^7$ are hydrogen or contain a single saturated hydrocarbon radical among the n methylene units, and where said amide has a molecular weight of from about 160 to about 250 atomic mass units and a carbon to oxygen ratio of from about 7 to about 16.

19. A method of lubricating a compressor in a compression refrigeration and/or air-conditioning apparatus containing HFC, PFC, HFE, ammonia and/or carbon dioxide, comprising the step of adding to said compressor the composition comprising a POE refrigerant lubricant and an an additive comprising an amide, wherein the amide is represented by the formula cyclo-$[(CR^6R^7)_n CON(R^5)-]$, wherein n is selected from integers from 3 to 5, $R^6$ and $R^7$ are hydrogen or contain a single saturated hydrocarbon radical among the n methylene units, and $R^5$ is selected from saturated hydrocarbon radicals containing from 1 to 12 carbon atoms, and where said amide has a molecular weight of from about 160 to about 250 atomic mass units and a carbon to oxygen ratio of from about 7 to about 16.

20. A method for improving the energy efficiency and/or capacity of a compression refrigeration and/or air-conditioning apparatus containing a refrigeration composition comprising at least one refrigerant selected from the group consisting of hydrofluorocarbons, perfluorocarbons, hydrofluoroethers, ammonia and carbon dioxide; and at least one POE refrigeration lubricant; said method comprises the step of adding to said compression refrigeration and/or air-conditioning apparatus at least one additive comprising an amide represented by the formulae cyclo-$[R^4CON(R^5)-]$, wherein $R^5$ is selected from aliphatic and alicyclic hydrocarbon radicals having from 1 to 12 carbon atoms; $R^4$ is represented by the hydrocarbylene radical $(CR^6R^7)_n$, wherein n is selected from integers from 3 to 5, $R^6$ and $R^7$ are hydrogen or contain a single saturated hydrocarbon radical among the n methylene units, and where said amide has a molecular weight of from about 160 to about 250 atomic mass units and a carbon to oxygen ratio of from about 7 to about 16.

21. A composition for use in compression refrigeration and air conditioning apparatus containing POE lubricant, said refrigerant composition comprising: (a) at least one refrigerant selected from the group consisting of hydrofluorocarbons, perfluorocarbons, hydrofluoroethers, ammonia and carbon dioxide; and at least one additive comprising an amide, wherein the amide is represented by the formula cyclo-$[(CR^6R^7)_n CON(R^5)-]$, wherein n is selected from integers from 3 to 5, $R^6$ and $R^7$ are hydrogen or contain a single saturated hydrocarbon radical among the n methylene units, and $R^5$ is selected from saturated hydrocarbon radicals containing from 1 to 12 carbon atoms, and where said amide has a molecular weight of from about 160 to about 250 atomic mass units and a carbon to oxygen ratio of from about 7 to about 16.

22. A process for producing heat, comprising condensing a composition for use in compression refrigeration and air conditioning apparatus containing POE lubricant, said refrigerant composition comprising: (a) at least one refrigerant selected from the group consisting of hydrofluorocarbons, perfluorocarbons, hydrofluoroethers, ammonia and carbon dioxide; and at least one additive comprising an amide, wherein the amide is represented by the formula cyclo-$[(CR^6R^7)_n CON(R^5)-]$, wherein n is selected from integers from 3 to 5, $R^6$ and $R^7$ are hydrogen or contain a single saturated hydrocarbon radical among the n methylene units, and $R^5$ is selected from saturated hydrocarbon radicals containing from 1 to 12 carbon atoms, and where said amide has a molecular weight of from about 160 to about 250 atomic mass units and a carbon to oxygen ratio of from about 7 to about 16.

23. A composition comprising:
(a) at least one POE refrigeration lubricant; and
(b) at least one additive comprising an amide, wherein said amide is represented by the formula cyclo-$[CR^6R^7)_n CON(R^5)-]$, wherein n is selected from integers from 3 to 5, $R^6$ and $R^7$ are hydrogen or contain a single saturated hydrocarbon radical among the n methylene units, and $R^5$ is selected from saturated hydrocarbon radicals containing from 1 to 12 carbon atoms, and wherein said amide has a molecular weight of from about 160 to about 250 atomic mass units and a carbon to oxygen ratio of from about 7 to about 16.

24. A composition comprising:
(a) at least one POE refrigeration lubricant; and
(b) at least one additive comprising an amide, wherein said amide is represented by the formula cyclo-$[CR^6R^7)_n CON(R^5)-]$, wherein n is selected from integers from 3 to 5, $R^6$ and $R^7$ are hydrogen or contain a single saturated hydrocarbon radical among the n methylene units, and $R^5$ is selected from saturated hydrocarbon radicals containing from 1 to 12 carbon atoms, and wherein said amide has a molecular weight of from about 160 to about 250 atomic mass units and a carbon to oxygen ratio of from about 7 to about 16.

25. A composition for use in compression refrigeration and air conditioning apparatus containing POE lubricant, said refrigerant composition comprising:
(a) at least one refrigerant selected from the group consisting of hydrofluorocarbons, perfluorocarbons, hydrofluoroethers, ammonia and carbon dioxide; and
(b) at least one additive comprising an amide, wherein said amide is represented by the formula cyclo-

[CR$^6$R$^7$)$_n$CON(R$^5$)—], wherein n is selected from integers from 3 to 5, R$^6$ and R$^7$ are hydrogen or contain a single saturated hydrocarbon radical among the n methylene units, and R$^5$ is selected from saturated hydrocarbon radicals containing from 1 to 12 carbon atoms, and wherein said amide has a molecular weight of from about 160 to about 250 atomic mass units and a carbon to oxygen ratio of from about 7 to about 16.

26. A method of producing refrigeration with compression refrigeration and/or air-conditioning systems containing HFC, PFC, HFE, ammonia and/or carbon dioxide refrigerant, and a POE refrigeration lubricant which comprises the step of evaporating said refrigerant with said lubricant in the presence of an effective amount of additive comprising an amide represented by the formula cyclo-[R$^4$CON(R$^5$)—], wherein R$^5$ is selected from aliphatic and alicyclic hydrocarbon radicals having from 1 to 12 carbon atoms, R$^4$ is represented by the hydrocarbylene radical (CR$^6$R$^7$)$_n$, wherein n is selected from integers from 3 to 5, R$^6$ and R$^7$ are hydrogen or contain a single saturated hydrocarbon radical among the n methylene units, and where said amide has a molecular weight of from about 160 to about 250 atomic mass units and a carbon to oxygen ratio of from about 7 to about 16.

27. A method of lubricating a compressor in a compression refrigeration and/or air-conditioning apparatus containing HFC, PFC, HFE, ammonia and/or carbon dioxide, comprising the step of adding to said compressor a composition comprising:
    (a) at least one POE refrigeration lubricant; and
    (b) at least one additive comprising an amide, wherein said amide is represented by the formula cyclo-[R$^4$CON(R$^5$)—], wherein R$^5$ is selected from aliphatic and alicyclic hydrocarbon radicals having from 1 to 12 carbon atoms and R$^4$ is represented by the hydrocarbylene radical (CR$^6$R$^7$)$_n$, wherein n is selected from integers from 3 to 5, R$^6$ and R$^7$ are hydrogen or contain a single saturated hydrocarbon radical among the n methylene units, and where said amide has a molecular weight of from about 160 to about 250 atomic mass units and a carbon to oxygen ratio of from about 7 to about 16.

28. A method for improving the energy efficiency and/or capacity of a compression refrigeration and/or air-conditioning apparatus containing a refrigeration composition comprising at least one refrigerant selected from the group consisting of hydrofluarocarbons, perfluorocarbons, hydrofluoroethers, ammonia and carbon dioxide; and at least one POE refrigeration lubricant; said method comprises the step of adding to said compression refrigeration and/or air-conditioning apparatus at least one additive represented by the formula cyclo-[R$^4$CON(R$^5$)—], wherein R$^5$ is selected from aliphatic and alicyclic hydrocarbon radicals having from 1 to 12 carbon atoms and wherein R$^4$ is represented by the hydrocarbylene radical (CR$^6$R$^7$)$_n$, wherein n is selected from integers from 3 to 5, R$^6$ and R$^7$ are hydrogen or contain a single saturated hydrocarbon radical among the n methylene units, and where said amide has a molecular weight of from about 160 to about 250 atomic mass units and a carbon to oxygen ratio of from about 7 to about 16.

29. A process for producing refrigeration, comprising condensing a composition comprising:
    (a) at least one POE refrigeration lubricant; and
    (b) at least one additive comprising an amide, wherein said amide is represented by the formula cyclo-[CR$^6$R$^7$)$_n$CON(R$^5$)—], wherein n is selected from integers from 3 to 5, R$^6$ and R$^7$ are hydrogen or contain a single saturated hydrocarbon radical among the n methylene units, and R$^5$ is selected from saturated hydrocarbon radicals containing from 1 to 12 carbon atoms, and wherein said amide has a molecular weight of from about 160 to about 250 atomic mass units and a carbon to oxygen ratio of from about 7 to about 16,
    and thereafter evaporating said composition in the vicinity of a body to be cooled.

30. A process for producing refrigeration, comprising condensing a composition comprising:
    (a) at least one refrigerant selected from the group consisting of hydrofluorocarbons, perfluorocarbons, hydrofluoroethers, ammonia and carbon dioxide; and
    (b) at least one additive comprising an amide, wherein said amide is represented by the formula cyclo-[CR$^6$R$^7$)$_n$CON(R$^5$)—], wherein n is selected from integers from 3 to 5, R$^6$ and R$^7$ are hydrogen or contain a single saturated hydrocarbon radical among the n methylene units, and R$^5$ is selected from saturated hydrocarbon radicals containing from 1 to 12 carbon atoms, and wherein said amide has a molecular weight of from about 160 to about 250 atomic mass units and a carbon to oxygen ratio of from about 7 to about 16,
    and thereafter evaporating said composition in the vicinity of a body to be cooled.

31. A process for producing heat, comprising condensing a composition comprising:
    (a) at least one POE refrigeration lubricant; and
    (b) at least one additive comprising an amide, wherein said amide is represented by the formula cyclo-[CR$^6$R$^7$)$_n$CON(R$^5$)—], wherein n is selected from integers from 3 to 5, R$^6$ and R$^7$ are hydrogen or contain a single saturated hydrocarbon radical among the n methylene units, and R$^6$ is selected from saturated hydrocarbon radicals containing from 1 to 12 carbon atoms, and wherein said amide has a molecular weight of from about 160 to about 250 atomic mass units and a carbon to oxygen ratio of from about 7 to about 16,
    and thereafter evaporating said composition.

32. A process for producing heat, comprising condensing a composition comprising:
    (a) at least one refrigerant selected from the group consisting of hydrofluorocarbons, perfluorocarbons, hydrofluoroethers, ammonia and carbon dioxide; and
    (b) at least one additive comprising an amide, wherein said amide is represented by the formula cyclo-[CR$^6$R$^7$)$_n$CON(R$^5$)—], wherein n is selected from integers from 3 to 5, R$^6$ and R$^7$ are hydrogen or contain a single saturated hydrocarbon radical among the n methylene units, and R$^5$ is selected from saturated hydrocarbon radicals containing from 1 to 12 carbon atoms, and wherein said amide has a molecular weight of from about 160 to about 250 atomic mass units and a carbon to oxygen ratio of from about 7 to about 16,
    and thereafter evaporating said composition.

\* \* \* \* \*